R. E. HELLMUND.
REGENERATIVE CONTROL FOR SINGLE PHASE MOTORS.
APPLICATION FILED SEPT. 13, 1919.

1,411,023. Patented Mar. 28, 1922.

WITNESSES:
J. A. Helsel
W. R. Cole

INVENTOR
Rudolf E. Hellmund.
BY
Wesley G. Carr
ATTORNEY

UNITED STATES PATENT OFFICE.

RUDOLF E. HELLMUND, OF SWISSVALE, PENNSYLVANIA, ASSIGNOR TO WESTING-HOUSE ELECTRIC & MANUFACTURING COMPANY, A CORPORATION OF PENN-SYLVANIA.

REGENERATIVE CONTROL FOR SINGLE-PHASE MOTORS.

1,411,023.   Specification of Letters Patent.   Patented Mar. 28, 1922.

Application filed September 13, 1919. Serial No. 323,571.

*To all whom it may concern:*

Be it known that I, RUDOLF E. HELLMUND, a citizen of the German Empire, and a resident of Swissvale, in the county of Allegheny and State of Pennsylvania, have invented a new and useful Improvement in Regenerative Controls for Single-Phase Motors, of which the following is a specification.

My invention relates to the control of the dynamo-electric machines, and it has special relation to the regenerative control of single-phase motors employing a phase-converting machine during such operation.

Certain prior systems for effecting regenerative control in a system of the above-indicated character have required two banks of high-capacity switches and preventive coils, the one bank for adjusting the voltage of the working circuit and the other for regulating the phase of the exciting field current. It is one object of my present invention to replace the bank of switches corresponding to regenerative operation by a resistance-varying drum of relatively small capacity, whereby a material saving in cost and weight of equipment is effected.

Another object of my invention is to provide a system of the class under consideration wherein a relay device, responsive to power-factor conditions in the single-phase regenerating machine, is adapted to regulate the direct-current excitation of a synchronous phase-converter that supplies energy to the exciting field winding of the single-phase machine, whereby a predetermined power-factor may be maintained throughout a wide range of operation.

Another object of my invention is to provide a switching device in conjunction with the above-mentioned power-factor relay device and its attendant circuits, whereby the machine-armature voltage is varied responsively to predetermined conditions of the relay device and of the excitation of the phase-converter.

Figure 1:
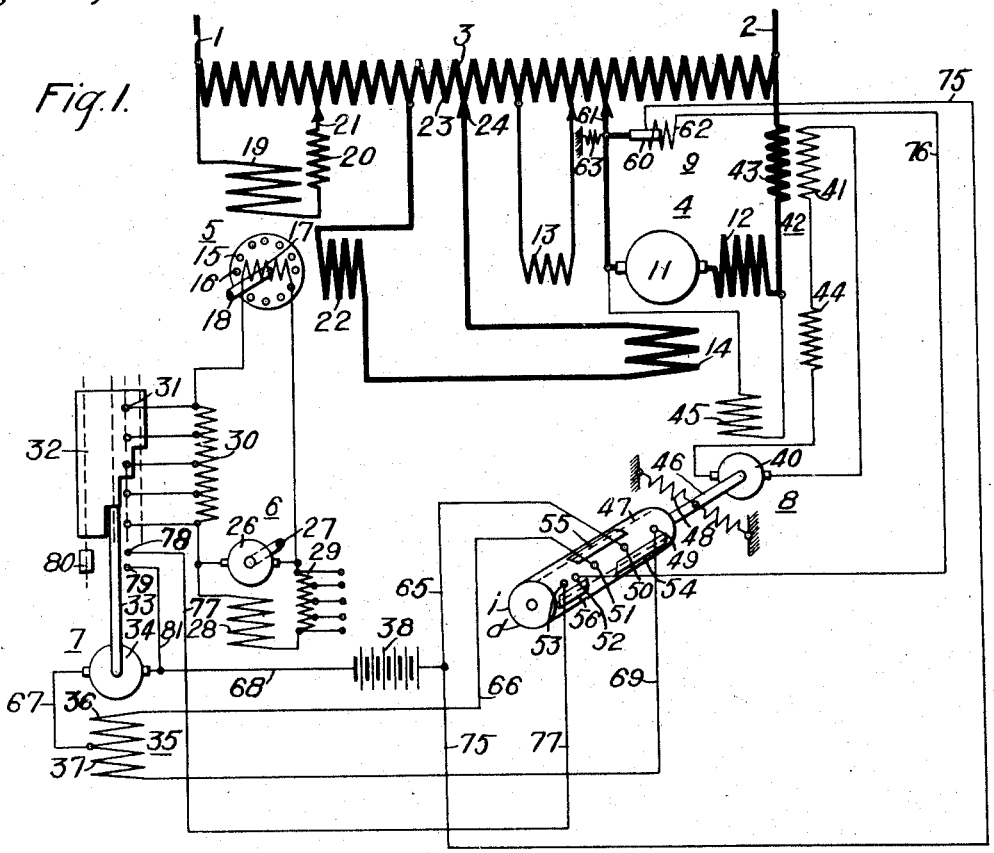
Figure 2:
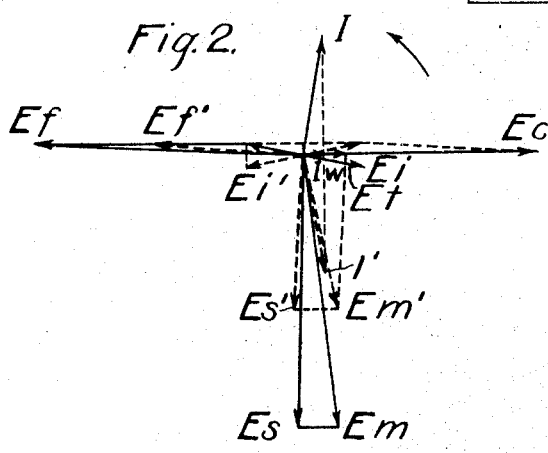
Figure 3:
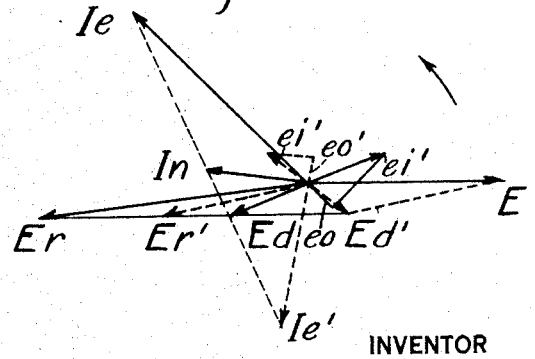

My invention may best be understood by reference to the accompanying drawing, wherein Fig. 1 is a diagrammatic view of the essential circuits of a control system organized in accordance with the present invention, and Fig. 2 and Fig. 3 are vector diagrams serving to graphically set forth various operating conditions in the system during the regenerative period.

Referring to Fig. 1 of the drawing, the system here shown comprises suitable supply conductors or mains, 1 and 2, connected to a transformer winding 3 for supplying energy to a single-phase commutator motor 4 and a cooperating phase-converter 5 of the synchronous type, the direct-current excitation of which, from an auxiliary generator 6, may be varied by means of a pilot-motor-controlled device 7, the movements of which are responsive to a power-factor relay device 8. A switching device 9 for varying the machine-armature voltage is energized in response to certain joint conditions of the power-factor relay device 8 and the excitation of the phase-converter 5, as hereinafter more fully set forth.

The single-phase motor 4 comprises a commutator-type armature 11, a conductively-connected neutralizing field winding 12, an interpole or commutating field winding 13, and a main or exciting field winding 14.

The phase-converter 5 comprises a rotor 15 which is provided with a squirrel-cage winding 16 for assisting in the desired inductive transfer of energy, and also with a field winding 17 that is energized from the direct-current generator 6 for the purpose of regulating the power-factor of the single-phase machine 4, in accordance with previously known principles.

The rotor 15 is further provided with a shaft 18, whereby the phase-converter may be started into operation, according to a well-known method. The stator of the phase-converter is provided with a primary winding 19, which is connected, through an impedance device 20 and a movable tap 21, across a section of the supply transformer 3, while a tertiary or generating winding 22 is located at right angles to the primary winding 19, as is customary, and is connected, through a portion 23 of the supply-transformer winding and a shiftable tap 24, to the exciting field winding 14 for the single-phase motor 4. The exciting field winding 14 is thus energized, partially in accordance with the supply-transformer voltage but chiefly from the tertiary winding 22 of the phase-converter, whereby the desired phase relations, to effect regenerative operation of the single-phase machine 4, may be maintained in the field-winding circuit.

The auxiliary generator 6 comprises a direct-current, commutator-type armature 26 which is provided with an operating shaft 27, the shaft being driven through any suitable agency, such as a small induction motor (not shown) or a truck axle. A shunt field winding 28 for the auxiliary generator is connected through a variable resistor 29. A second variable resistor 30, different points in which are connected to a series of control fingers 31, is connected in circuit with the auxiliary generator armature 26 and the exciting rotor winding 17 of the phase-converter. Consequently, by varying either the resistor 29 in any suitable manner, or varying the resistor 30 by means of a drum controller 32, for example, the excitation of the phase-converter 5 may be regulated to adjust the power-factor of the single-phase machine 4.

The operating shaft 33 for the drum controller 32 is suitably secured to the commutator-type armature 34 of the pilot motor 7, which is also provided with an exciting field winding 35 having two equal sections 36 and 37 that respectively correspond to reverse and forward operation of the pilot motor. A suitable source of energy, such as a storage battery 38, is provided in the circuit of the pilot motor 7 and the secondary circuits of the power-factor relay 8, as subsequently traced in detail.

The power-factor relay device 8 comprises a commutator-type armature 40, which is energized from the secondary winding 41 of an auxiliary transformer 42, the primary winding of which is connected in series relation with the armature 11 of the single-phase motor 4. An impedance device 44 is also preferably connected in circuit with the relay device armature 40, to allow the desired operating adjustment. The other component element of the relay device, namely, the exciting field winding 45, is connected across the armature 11 and inducing field winding 12 of the single-phase motor. The cooperating members of the relay device 8 are thus respectively energized in accordance with the machine-armature current and voltage, or, in other words, the relay device 8 is actuated in accordance with variations in the machine power-factor.

Secured to the operating shaft 46 of the relay device 8 is a small drum 47, which is maintained in the illustrated "off" or inoperative position by means of a plurality of centering springs 48. A plurality of control fingers 49 to 53, inclusive, bear upon the surface of the drum, and are adapted to selectively engage contact segments 54, 55 and 56 when the relay device occupies the one or the other of its extreme positions $i$ or $d$ respectively, corresponding to an increase and a decrease of the active circuit value of the resistor 30.

The switching device 9 may take any suitable form, and is here shown as comprising a solenoid device having a core or plunger 60 that is suitably attached to a movable tap 61 in the circuit of the machine-armature 11, a magnetizing winding 62 being provided for actuating the core 60 toward the right, under operative conditions of the switching device, which is biased toward the illustrated position, by means of a suitable spring 63.

Assuming that the various illustrated connections have been made to effect regenerative operation of the single-phase machine 4, the operation of the illustrated auxiliary devices 7, 8 and 9 may be set forth as follows: Upon a variation in the power-factor conditions of the single-phase machine 4, as reflected in the currents traversing the armature 40 and the field winding 45 of the relay device 8, this device is actuated in the one or the other direction, for example, into position $i$, whereupon a circuit is established from one terminal of the storage battery 38 through conductor 65, control fingers 50 and 51, which are bridged by contact segments 55 of the relay device, conductor 66, field-winding section 36 of the pilot motor 7, conductor 67, armature 34 of the pilot motor and conductor 68 to the opposite battery terminal. The pilot-motor controller 32 is thus actuated in a reverse direction to include a certain increased portion of the resistor 30 in circuit, thus decreasing the excitation of the phase-converter rotor winding 17, whereby the power-factor in the single-phase motor 4 is restored to the desired normal value.

On the other hand, if the power-factor shifts in the opposite direction, the relay device 8 is correspondingly actuated to its other extreme position $d$, whereupon a circuit is continued from the positively energized conductor 65 through control fingers 50 and 49, which are bridged by contact segment 54, whence circuit is completed, through conductor 69, field-winding section 37 of the pilot motor and the armature thereof, to negative conductor 68. In this way, the controller 32 is actuated in the forward direction to gradually decrease the active circuit value of the resistor 30, and thus augment the excitation of the phase-converter rotor winding 17 until the desired power-factor conditions in the single-phase machine 4 have been reestablished.

Further regulation of the machine operation, as regards load and torque adjustment, may be accomplished by means of the switching device 9. Whenever the resistor-varying drum 32 occupies its extreme right-hand position, corresponding to a complete exclusion of the resistor 30 from circuit, provided that the power-factor relay device 8 then assumes its position $d$ corresponding to further increase of the phase-converter excitation, the switching device 9 is then energized to shift the transformer tap 61 towards the right, and thus compensatingly reduce the voltage impressed upon the machine armature 11.

Such action is accomplished by the establishment of an auxiliary circuit from one terminal of the storage battery 38 through conductor 75, magnetizing winding 62 of the switching device 9, conductor 76, control fingers 52 and 53, which are bridged by contact segment 56 in position $d$ of the power-factor relay device 8, whence circuit is continued through conductor 77, control fingers 78 and 79, which are bridged by contact segment 80 in the above-mentioned extreme position of the controller 32, circuit being completed through conductors 81 and 68 to the opposite battery terminal. The consequent energization of the actuating coil 62 shifts the transformer tap 61 into a voltage-reducing position.

In this way, I have provided a system wherein a smooth and effective control of an alternating-current regenerative system is provided without requiring the customary bank of heavy switches for regenerative purposes only, while, at the same time, proper power-factor and torque conditions in the motor are automatically maintained. It will be appreciated that the maintenance of such proper torque conditions in the motor is important, since, whenever the field and the load current are not substantially in phase, the root-mean-square current, and, therefore, the heating of the motor are unduly increased.

The vector diagrams of Fig. 2 and Fig. 3 illustrate the working principles of the present invention. Let $Ec$ = the supply-transformer voltage impressed upon the primary converter winding 19. If
$I$ = a leading current and
$I'$ = a lagging current, then by changing the excitation of the phase-converter, the value of the input current may be varied from $I$ to $I'$.
$Iw$, representing the power or watt current in the converter, may be assumed as nearly constant, so that the change in the total current from $I$ to $I'$ follows the vertical line connecting the ends of these two vectors.
$Ei$ and $Ei'$ = the primary inductive voltage drops, which lag 90° behind the corresponding currents, $I$ and $I'$. Consequently, the change from the one to the other follows a straight line between the two vectors $Ei$ and $Ei'$.

By subtracting the reversed vectors $Ei$ and $Ei'$ from $Ec$, we obtain
$Ef$ and $Ef'$, which represent the corresponding voltages induced by the converter field winding 17. The corresponding secondary or rotor voltages in the phase-converter are represented by
$Es$ and $Es'$, which are shifted 90 electrical degrees with respect to the primary voltages.

If the secondary voltages are combined with a voltage
$Et$, which is derived from the transformer section 23, the vectors
$Em$ and $Em'$, representing the main or exciting field voltages are obtained. These voltages induce field currents which lag approximately 90° behind them, which currents, in turn, induce voltages
$Er$ and $Er'$, shown in Fig. 3, which represent the corresponding rotational voltages in the phase-converter. If
$E$ = the impressed voltage across the motor armature 11 and neutralizing field winding 12 from the right-hand section of the supply-transformer 3, the combination of the rotational voltages with the impressed voltage $E$ produces the voltage vectors
$Ed$ and $Ed'$, which neutralize the resultants of the vectors
$ei$ and $ei'$, representing the ohmic drops in the single-phase machine circuit and
$eo$ and $eo'$, representing the corresponding inductive voltage drops.
$Ie$ and $Ie'$, representing the load currents, extend in opposite directions, and are proportional to the respective ohmic drops. The change from the one to the other vector again follows along a straight line connecting them.

Consequently, by changing the excitation of the phase-converter, the load current of the single-phase machine 4 may be varied between the values represented by $Ie$ and $Ie'$, and the vector.
$In$, represents the value of load current corresponding to the desired power-factor.

To accomplish the required change of load current without large variations in the primary current of the phase-converter, the impedance device 20 is connected in circuit with the primary converter winding 19 to cause relatively large changes in the primary inductive voltage drops concurrently with small current variations.

I do not wish to be restricted to the specific circuit connections or arrangements of parts herein set forth, as various modifications thereof may be effected without departing from the spirit and scope of my invention. I desire, therefore, that only such limitations shall be imposed as are indicated by the appended claims.

I claim as my invention:

1. In an alternating-current regenerative system, the combination with a dynamo-electric machine having an armature and a field-producing winding, of a synchronous phase-converter for exciting said winding, and means responsive to predetermined phase relations in the machine circuits for regulating the excitation of said converter.

2. In an alternating-current regenerative system, the combination with a dynamo-electric machine having an armature and a field-producing winding, of a synchronous phase-converter for exciting said winding, and a relay device responsive to power-factor conditions in said machine for compensatingly varying the excitation of said converter.

3. In an alternating-current regenerative system, the combination with a dynamo-electric machine having an armature and a field-producing winding, of a synchronous phase-converter for exciting said winding, a relay device having its component elements respectively energized in accordance with the machine-armature current and voltage, and means responsive to the movements of said relay device for varying the excitation of said converter.

4. In an alternating-current regenerative system, the combination with a dynamo-electric machine having an armature and a field-producing winding, of a synchronous phase-converter for exciting said winding, a motor-type relay device having its component elements respectively energized in accordance with the machine-armature current and voltage, and a pilot motor energized to run in the one or the other direction responsively to the movements of said relay device for regulating the excitation of said converter.

5. In an alternating-current regenerative system, the combination with a dynamo-electric machine having an armature and a field winding, of a phase-converter for exciting said field winding and having a direct-current-excited rotor winding, a variable resistor in circuit with said rotor winding, a pilot motor for controlling the variation of said resistor, and a motor-type relay device having its component elements respectively energized in accordance with the machine-armature current and voltage for energizing said pilot motor to vary said resistor in the one or the other sense, whereby a predetermined machine power-factor may be maintained.

6. In an alternating-current regenerative system, the combination with a dynamo-electric machine having an armature and a field-producing winding, of a synchronous phase-converter for exciting said winding, means responsive to predetermined phase relations in the machine circuits for regulating the excitation of said converter, and means responsive directly to said phase relations and indirectly to said excitation for regulating the machine-armature voltage.

7. In an alternating-current regenerative system, the combination with a dynamo-electric machine having an armature and a field-producing winding, of a synchronous phase-converter for exciting said winding, a relay device responsive to power-factor conditions in said machine for varying the excitation of said converter, and means responsive directly to the position of said relay device for varying the machine-armature voltage.

8. In an alternating-current regenerative system, the combination with a dynamo-electric machine having an armature and a field-producing winding, of a synchronous phase-converter for exciting said winding, means actuated upon a variation of power-factor in said machine from a given value for regulating the converter excitation to restore said value of power-factor, and means for compensatingly varying the machine-armature voltage under limit conditions of operation of said first means.

9. In an alternating-current regenerative system, the combination with a dynamo-electric machine having an armature and a field-producing winding, of a synchronous phase-converter for exciting said winding, a relay device having its component elements respectively energized in accordance with the machine-armature current and voltage, movable means responsive to the position of said relay device for varying the excitation of said converter, and means responsive jointly to the positions of said relay device and of said movable means for regulating the machine-armature voltage.

10. In an alternating-current regenerative system, the combination with a dynamo-electric machine having an armature and a field-producing winding, of a synchronous phase-converter for exciting said winding, a motor-type-relay device having its component elements respectively energized in accordance with the machine armature current and voltage, a pilot motor energized to run in the one or the other direction responsively to the movements of said relay device for regulating the excitation of said converter, and means energized in certain positions of said relay device and of said pilot motor for regulating the machine torque.

11. In an alternating-current regenerative system, the combination with a dynamo-electric machine having an armature and a field winding, of a phase-converter for exciting said field winding and having a direct-current-excited rotor winding, a variable resistor in circuit with said rotor winding, a pilot motor for controlling the variation of said resistor, a motor-type relay device having its component elements respectively energized in accordance with the machine-armature current and voltage for energizing said pilot motor to vary said resistor in the one or the other sense, whereby a predetermined machine power factor may be maintained, and a switching device energized when said relay device occupies a predetermined operative position and said resistor has a predetermined active value for actuating said switching device to reduce the machine-armature voltage, whereby a given machine torque may be maintained.

12. In an alternating-current regenerative system, the combination with a dynamo-electric machine having an armature and a field-producing winding, of a synchronous phase-converter for exciting said winding, and means responsive to variations in predetermined electric quantities appertaining to the machine circuits for regulating the excitation of said converter.

In testimony whereof, I have hereunto subscribed my name this 26th day of Aug. 1919.

RUDOLF E. HELLMUND.